(No Model.)
LA FAYETTE DAVIS.
SAP PAIL COVER AND HOLDER.
No. 261,539. Patented July 25, 1882.
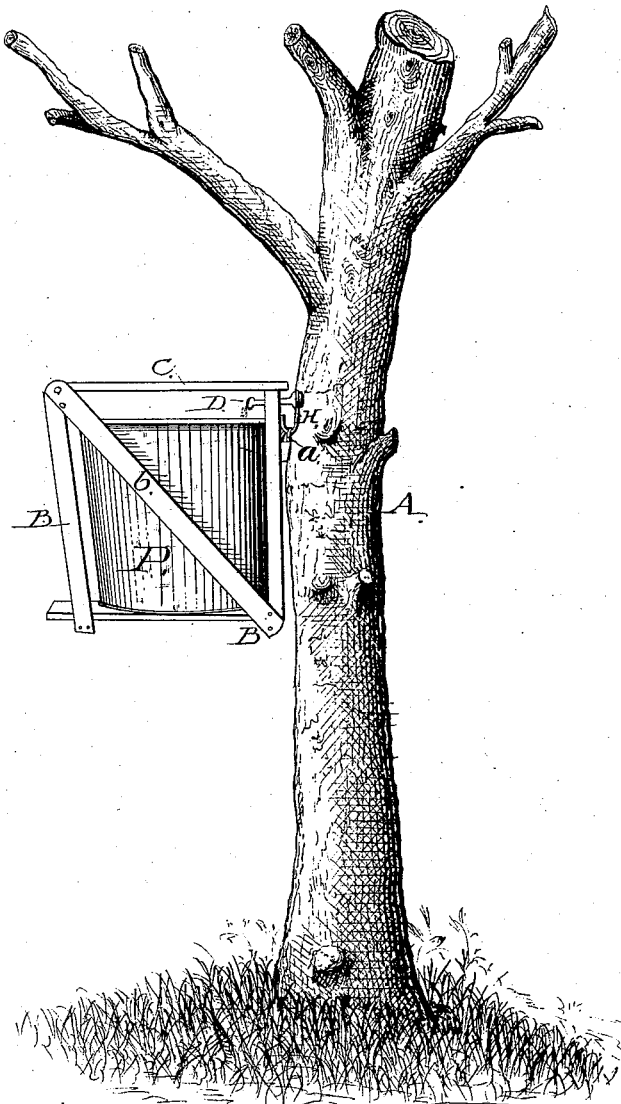
Witnesses;
Walter Fowler
L. M. Thomas
Inventor;
La Fayette Davis
per Milo Harris
Atty

United States Patent Office.

LAFAYETTE DAVIS, OF BUSTI, NEW YORK.

SAP-PAIL COVER AND HOLDER.

SPECIFICATION forming part of Letters Patent No. 261,539, dated July 25, 1882.

Application filed April 28, 1882. (No model.)

*To all whom it may concern:*

Be it known that I, LAFAYETTE DAVIS, of Busti, in the county of Chautauqua and State of New York, have invented certain new and useful Improvements in Sap-Pail Covers and Holders; and I do hereby declare that the following is a full, clear, and exact description of the invention, which will enable others skilled in the art to which it appertains to make and use the same, reference being had to the accompanying drawing, which forms a part of this specification.

The object of my invention is to make a cheap and durable frame for holding a sap-pail to the tree, and providing the same with a stationary cover, all of which will be readily understood by the following specification and the accompanying drawing, in which the invention is shown in perspective.

In sugar-making the common method of setting a sap-pail without cover under the spout has always been found objectionable because of the liability to catch rain-water, and to overcome this various methods of securing a cover to the tree or pail have been used; but none of these seem to be free from objection, because of the trouble to use them.

In the drawing, A represents a sugar-tree. B is a skeleton frame for holding a sap-pail, and may be made of strips of wood nailed together, as shown, having a bottom securely fastened in, and a cover, $c$, rigidly attached for the top. A brace, $b$, is secured diagonally across the frame on each side, the object being not only to give strength to the frame, but at the same time hold the pail securely in place.

D is the sap-spout; H, the hook attached thereto.

The frame has a cleat or cross-bar near the top, and a staple through this makes an efficient means for securing the frame to the tree; but other means of securing the frame to the tree may be used when desired. The frame is hung or secured to the tree and the pail P set in the frame from the front side, and is held without any other fastening, and can be readily emptied or turned bottom up when not in use.

I am aware that frames for holding a sap-pail to a tree and stationary covers have heretofore been used; so I do not claim the idea, broadly; but

What I claim as new, and desire to secure by Letters Patent, is—

In combination with a sap-pail, the frame B for holding the same to the tree, having a stationary cover, C, and means for attaching the same to the tree, substantially as shown, and for the purpose set forth.

In testimony that I claim the foregoing as my own I have hereto affixed my signature in presence of two witnesses.

LAFAYETTE DAVIS.

Witnesses:
W. H. TRUESDALE,
N. E. THOMAS.